United States Patent [19]
Neil

[11] Patent Number: 5,638,215
[45] Date of Patent: Jun. 10, 1997

[54] OBJECTIVE LENS SYSTEM

[75] Inventor: Iain A. Neil, Calabasas, Calif.

[73] Assignee: Panavision International, L.P., Tarzana, Calif.

[21] Appl. No.: 492,838

[22] Filed: Jun. 20, 1995

[51] Int. Cl.$^6$ .............................. G02B 1/06; G02B 3/12
[52] U.S. Cl. ........................................... 359/665; 359/666
[58] Field of Search ..................................... 359/666, 665

[56] References Cited

U.S. PATENT DOCUMENTS

| | | | |
|---|---|---|---|
| 3,498,695 | 3/1970 | Brouwer | 359/665 |
| 4,871,240 | 10/1989 | Suda | 359/666 |
| 4,884,879 | 12/1989 | Fukuda et al. | |
| 4,913,535 | 4/1990 | Robb | 359/665 |
| 4,958,919 | 9/1990 | Sigler | 359/665 |
| 5,204,782 | 4/1993 | Mercado et al. | 359/754 |
| 5,446,591 | 8/1995 | Medlock | 359/665 |

FOREIGN PATENT DOCUMENTS

| | | |
|---|---|---|
| 1464088 | 12/1966 | France . |
| 0254102 | 11/1987 | Japan . |
| 406130203 | 5/1994 | Japan . |
| 0000920 | of 1866 | United Kingdom . |

Primary Examiner—Scott J. Sugarman
Attorney, Agent, or Firm—Lyon & Lyon

[57] ABSTRACT

A high performance, large aperture, long focal length visible waveband objective lens system (60) comprises a telephoto objective lens group (48) spaced from a focusing lens group (49) and an auxiliary lens group (54), all supported in a support assembly (43) of fixed length. The lens groups are aligned on a common optical axis (40) and arranged to form a real image (34) in image space (42) from radiation entering the system (60) from a real object in object space (41). The telephoto objective lens group (48) is stationary and comprises a positively powered lens element (A) and a negatively powered lens sub-group (50) containing a quintuplet lens group (51) with lens elements (B, C, D, E, F) and a lens element (G). The quintuplet lens group includes two lens elements (C and E) of liquid materials which exhibit highly abnormal partial dispersions and one solid glass lens element (F) which exhibits slightly abnormal partial dispersion In addition, the liquid materials of lens elements (C) and (E) exhibit very large changes in refractive index with temperature and the material of lens element (F) exhibits a compensating large change in refractive index with temperature. The remaining lens elements of the system are common optical glass and exhibit substantially normal partial dispersions.

27 Claims, 3 Drawing Sheets

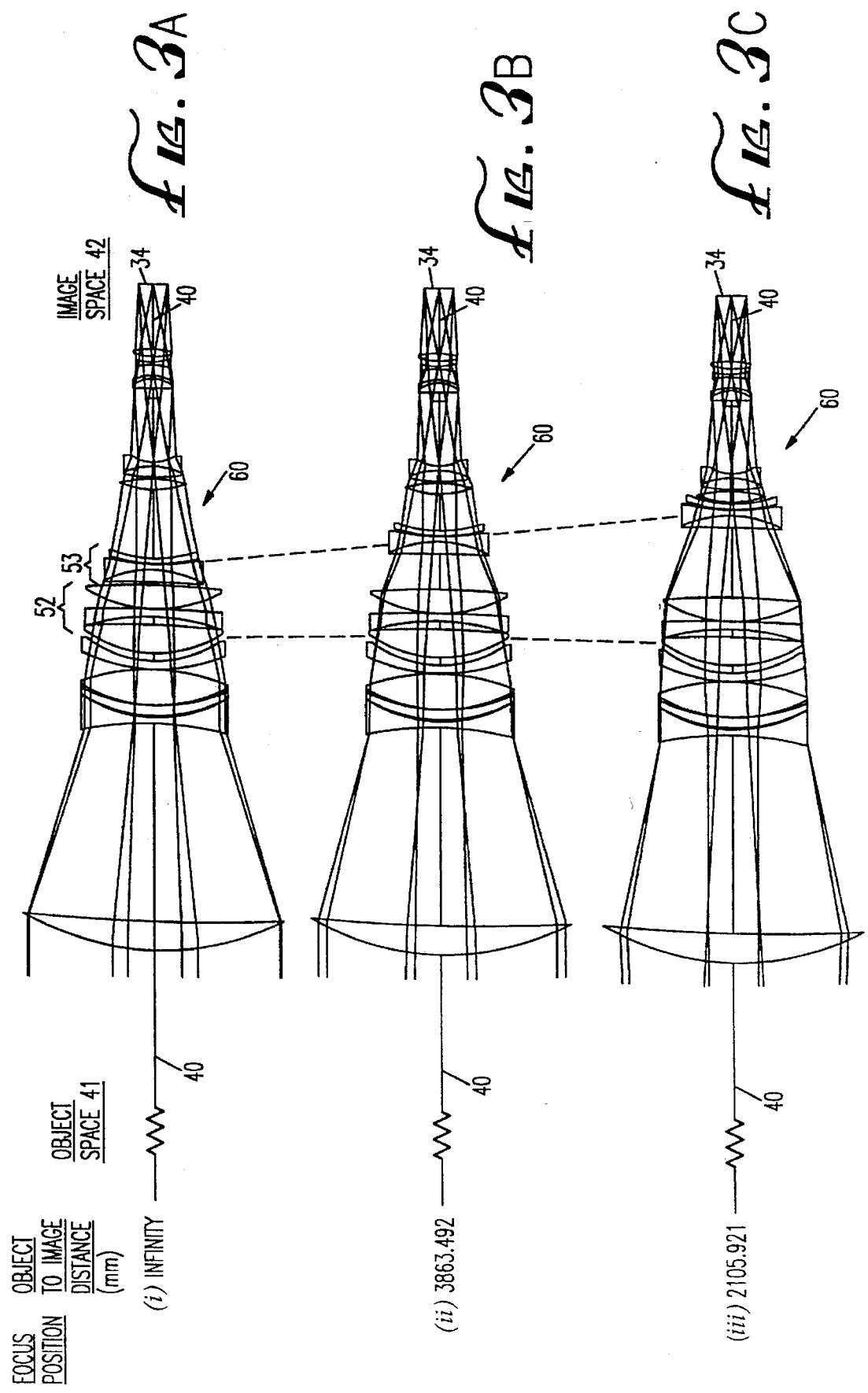

OBJECTIVE LENS SYSTEM

This invention relates to an optical objective lens system for cameras and the like and, in particular, to a large aperture, high performance, long focal length lens system using a combination of solid lenses and liquid lenses.

BACKGROUND OF THE INVENTION

High performance optical systems, such as for cinematography, require superior polychromatic optical performance and athermal characteristics. Previously, the design of large aperture, high performance, long focal length lens systems for the visible waveband has been limited by practical issues concerning length, volume, weight, cost and the availability of large dimensional sizes of raw material, especially glasses that exhibit abnormal dispersion characteristics. Catadioptric lenses do offer a significant reduction in overall length but they have the disadvantage of producing donut shaped images of out of focus point objects which, in many applications including cinematography, high definition television ("HDTV") and advanced television ("ATV") is unnatural and highly distracting or even disturbing to a viewer. In comparison, telephoto lenses offer reasonable compactness in terms of length and volume but demand multiple lens elements in the front objective grouping. These elements, apart from producing large weight, necessitate the use of abnormal dispersion glass or crystalline materials which are high in cost with limited availability or which may even be unavailable in large sizes. Aspheric surfaces can be used in the front objective grouping to reduce the quantity of lens elements required but aspheric surfaces are difficult to manufacture, are high in cost and do not eliminate the need for abnormal dispersion materials. Liquid optical materials which exhibit abnormal and highly abnormal dispersion characteristics, sometimes referred to as abnormal dispersion liquids (ADLs), offer an alternative to using abnormal dispersion glasses and crystals. However, liquid lens elements need to be supported and sealed by solid elements, for example, between two glass elements in a glass/liquid/glass cell which can be heavy in weight, especially when located in the front objective grouping because of the large diameter of the elements. If two compensating ADLs are employed, then the weight will be increased even more by the two glass/liquid/glass elements. In addition, liquid optical materials tend to exhibit large changes in refractive index with temperature changes, as compared to solid lens materials, which causes defocusing as well as loss of chromatic aberration control thus making the liquid lens system unusable at elevated and depressed temperatures.

SUMMARY OF THE INVENTION

It is an object of this invention to provide a large aperture, high performance, long focal length lens system for the visible waveband that is low in weight, relatively inexpensive, athermal and has superior polychromatic optical performance. For accomplishing that object, the lens system of this invention comprises a stationary telephoto objective lens grouping incorporating two liquid lens elements, a movable first focus lens grouping, a movable second focus lens grouping and a stationary auxiliary lens grouping which internally houses an optical stop or iris, all aligned on a common optical axis. By virtue of the telephoto objective design configuration, which contains a single spherically surfaced primary objective lens element and a rear telephoto lens grouping formed by quintuplet and singlet lenses, the system is compact and inexpensive with low weight.

The two independently movable focus lens groupings provide continuous focusing at a constant aperture over a focus range extending from an infinity object distance to a close focus object to image distance with an object to image magnification ratio of less than 3:1.

The two liquid elements, because of their highly abnormal dispersions, have low optical powers and therefore do not significantly affect the monochromatic aberration balance of the system. However, the system is well corrected for chromatic aberration. Furthermore, because the two liquid lens elements have opposite powers, they substantially compensate and correct the system as a whole for thermally induced defocus and aberration variations caused mainly by the very large changes in refractive index with temperature of the liquid materials. Although, the quintuplet lens group is formed by five elements, three glass and two liquid, the very thin liquid elements contribute very little to the overall weight of the quintuplet lens. The rear element of the quintuplet, which is farthest from the primary objective element, is preferably made of a glass or crystalline material that exhibits slightly abnormal dispersion and change in refractive index with temperature thus providing the system with a more consistent level of high performance at all operating temperatures. Apart from the two liquid elements and one rear element of the quintuplet lens, all remaining elements of the system can be made of standard glasses or other types of material which are low in cost and readily available from various vendors.

Another object of the present invention is to provide a large aperture high performance, long focal length lens system with a compact telephoto objective lens configuration which utilizes two abnormal dispersion liquid elements and one partly abnormal dispersion glass element. A still further object of the present invention is to provide a long focal length lens system which is low in weight and cost and provides a close focusing capability from an infinity object distance to a minimum focus distance magnification, object to image, of less than 3:1. A further object of the present invention is to provide a long focal length lens system which is substantially passively athermal both in constancy of image focus and quality over an extended range of object to image focus distances.

Other objects and advantages of the present invention will appear from the following description of a preferred embodiment and the accompanying drawings.

BRIEF DESCRIPTION OF THE DRAWINGS

FIGS. 3A, 3B and 3C are optical diagrams of the optical system shown in FIG. 1 with the focus lens groupings adjusted to different positions for three representative focus positions.

DESCRIPTION OF A PREFERRED EMBODIMENT OF THE INVENTION

A preferred embodiment of the present invention is now described by way of a design example with accompanying Figures and Tables.

Figure 1:
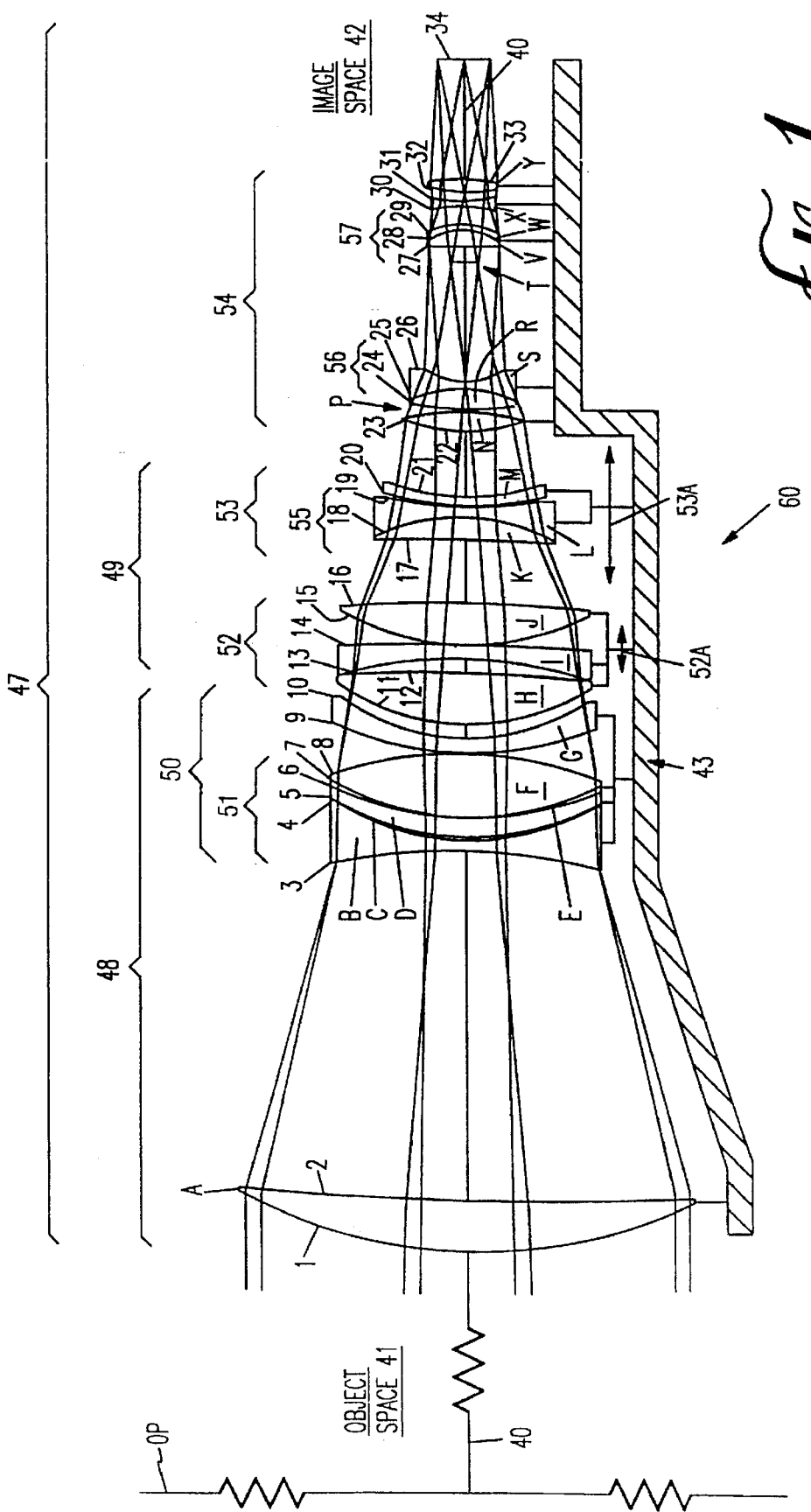
FIG. 1 is an optical diagram of the objective lens system of the present invention.

As depicted in FIG. 1, an optical system 60 comprises an objective lens arrangement 47 containing a plurality of spherically surfaced lens elements in lens groupings 48, 49, 54 aligned on an optical axis 40 wherein a positively powered, stationary, primary telephoto objective lens element "A" with refractive surfaces 1, 2 collects radiation from an object plane OP in object space 41 and relays said radiation to a negatively powered, stationary, secondary telephoto objective group 50, which relays said radiation to a positively powered, axially movable first focus group 52, which relays said radiation to a negatively powered, axially movable second focus group 53, which relays said radiation to a weakly powered, stationary, auxiliary lens group 54 which produces a real image at image plane 34 in image space 42. The real image at plane 34 may be received by film in a camera or the like in a conventional manner. The shapes of the lens elements illustrated in the FIGS. are only generally representative of the exact shapes, radii, thicknesses and sizes which are set forth below in Table I, to be discussed below. FIGS. 1, 3A, 3B and 3C include representative ray trace lines extending from immediately in front of lens element A through the optical system 60 to image plane 34.

Figure 2:
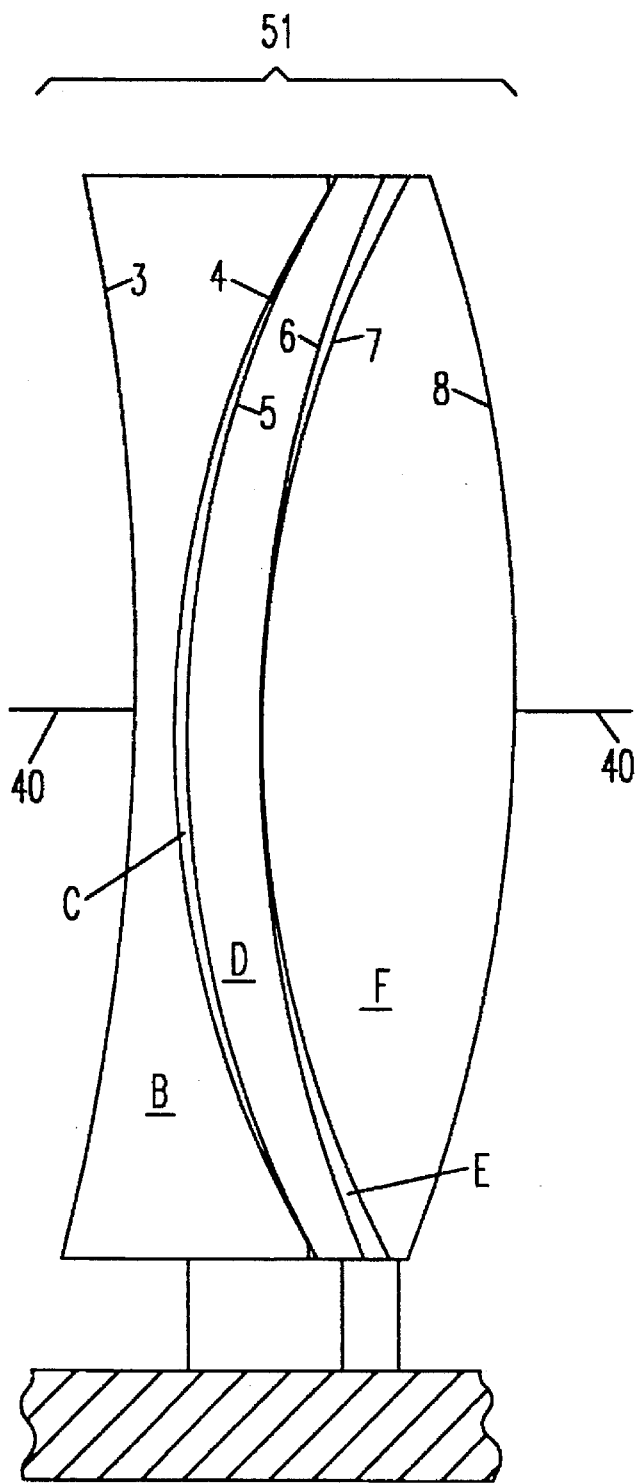
FIG. 2 is an enlarged diagrammatic view of a portion of the lens system shown in FIG. 1.

The secondary telephoto objective group 50, comprises a quintuplet lens sub-group 51 as depicted in greater detail in FIG. 2, with lens elements B, C, D, E, F having lens refractive surfaces 3, 4, 5, 6, 7, 8 and a singlet lens G with refractive surfaces 9, 10. It should be noted that for convenient reference, the two refractive "surfaces" of each of the two liquid lens elements C and E have been designated by the same reference number as the solid lens element refractive surface that contains that liquid because they are coincidental and coextensive therewith, such as, rear surface 4 of solid lens element B is the front surface 4 of liquid lens element C, rear surface 5 of liquid lens element C is the front surface 5 of solid lens element D, etc., whereby there are only six numerals 3–8 for the ten refractive surfaces of the five lens elements. The lens elements C and E are of liquid optical materials known as abnormal dispersion liquids (ADLs), as described below more fully, and the lens elements B, D and F are of solid lens material. The liquid lens element C is captured between solid lens elements B and D and the liquid lens element E is captured between solid lens elements D and F, with the five lens elements permanently assembled, in a conventional manner, to form the quintuplet (i.e. five integrated lenses) lens subgroup 51. The liquid materials for the liquid lens elements C and E are selected to be complimentary or self-compensating for their respective optical characteristics (as well as the optical characteristics of the system). Specifically, it is preferred that liquid lens C be an ADL that provides chromatic correction, such as an ADL manufactured by Cargille Laboratories, Inc., Cedar Grove, N.J., USA and marketed by Lockheed Martin under the Code No. 642134. However, the ADL for liquid lens C also has the characteristic of causing substantial defocusing, as compared with glass lens materials, in response to temperature changes. Thus, the ADL for liquid lens element E is selected to provide optical power which compensates for the defocusing by liquid lens element C caused by temperature changes, such as an ADL manufactured by Cargille Laboratories, Inc. and marketed by Lockheed Martin under the Code No. 295990. However, the ADL for lens element E degrades the chromatic correction accomplished by lens element C and, therefore, the specific ADLs selected for lens elements C and E cannot completely compensate for both temperature changes (i.e. the system is not athermal) and chromatic aberrations (i.e. image quality). Thus, it is preferred that solid lens element F be made from a glass or crystalline having a refractive index and thermal expansion which are relatively moderately temperature sensitive and a dispersion which is relatively partly abnormal, such as a glass made and sold by Ohara Corp. under the Code No. 438950 and name FPL 53 or the equivalent. In the preferred embodiment, the remaining solid lens elements B and D of the quintuplet lens 51 are preferably made from an inexpensive optical glass. It is to be understood that one or more of the other lens elements B, D or G of the secondary telephoto objective group 50 or the primary telephoto objective lens element A or even the lens elements of the first focus group 52 may be made of glass or crystalline material having the afore-described properties of lens element F rather than or in addition to lens element F for providing the thermal, chromatic and other corrections not compensated for by the liquid lens elements C and E without departing from the present invention.

The first focus group 52 comprises three lens elements H, I, J with refractive surfaces 11, 12, 13, 14, 15, 16 and the second focus group 53 comprises three lens elements K, L, M with surfaces 17, 18, 19, 20, 21 wherein the lens elements K, L form a doublet lens 55. Again, as with the quintuplet lens 51, the identical facing surfaces of lens elements K and L that are joined are identified as a single refractive surface 18. The auxiliary group 54 comprises a first singlet lens N with refractive surfaces 22, 23, an optical stop or iris P, a first doublet lens 56 formed by lens elements R, S with refractive surfaces 24, 25, 26, a field stop T, a second doublet lens 57 formed by lens elements V, W with refractive surfaces 27, 28, 29, a second singlet lens X with refractive surfaces 30, 31 and a third singlet lens Y with refractive surfaces 32, 33. As noted above, all of the lens elements H-N, R, S, V, W, X and Y may be of a common optical glass material. The optical system 60 is supported by a structure 43 which preferably is made of a light weight material, such as aluminum.

The construction of the optical system 60 is such that the distance on the optical axis 40 between the vertex of refractive surface 1 of lens element A to the real image plane 34 is fixed and remains constant, except for thermal expansion and contraction in the support structure 43. The first focus group 52 and the second focus group 53 are axially movable along the optical axis 40, as shown by the arrows 52A and 53A, respectively, in FIG. 1, in a conventional manner by conventional mechanisms without changing the length of the optical system 60. The supporting structure 43 is constructed to support all of the lens elements (A-N, R, S, V, W, X and Y) in series in that order on the optical axis 40 and at a maximum aperture diameter.

FIGS. 3A, 3B and 3C diagrammatically illustrate the optical system 60 with the first focus group 52 and the second focus group 53 moved to their respective positions for three different representative distances from the object plane OP to the image plane 34. Specifically, FIG. 3A shows the focus positions (i) of the first and second focus groups 52 and 53 for an object to image distance of infinity, FIG. 3B shows the focus positions (ii) of the first and second focus groups 52 and 53 with an object to image distance of 3863.492 mm, and FIG. 3C shows the focus positions (iii) of the first and second focus groups 52 and 53 for an object image distance of 2105.921 mm, which is the minimum focus distance for the optical system 60 to provide high performance optical characteristics. The positions of the first and second focus groups 52 and 53 and the respective object to image distances shown in FIGS. 3A, 3B and 3C, respectively, correspond to the Separation distances set forth in Table I (described and set forth below). The difference in the respective numbers for object to image distance in FIGS. 3B and 3C and the Separation between the Object Plane OP and refractive surface 1 of lens element A in Table I is simply the length (668 mm) of the optical system 60 between the vertex of refractive surface 1 of lens element A to the image plane 34. The second focus group 53 moves over a substantial range of approximately 67 mm for providing most of the focusing function of the optical system 60 while the first focus group 52 moves only a small amount of less than 4 mm for refining the focus by correcting or balancing aberrations that result from the substantial movement of the second focus group 53, which distances are also represented in Table I below, and from the lens group 48, as shown by the different positions of the ray trace lines through lens group 48 in FIGS. 3A, 3B and 3C.

Specific data for all of the lens elements of optical system 60, including surface separations, radii, material (type, code and name) and aperture diameter are set forth in the following Table I, wherein "Separation" is the distance between one Surface and the next Surface (objective plane OP, refractive surfaces 1-33 and image plane 34), and the "Type" of the "Material" is the material between that surface and the next surface progressing downwardly in Table I. The Separation for surfaces OP, 10, 16 and 21 are given at three representative focus distances, assuming the overall length of optical system 60 from the vertex of surface 1 of lens element A to the image plane 34 remains constant at 668 mm (i.e. ignoring thermal changes), and those focus distances are specifically set forth in the Separation column, opposite Object Plane OP. In other words, for example, for an intermediate focus distance of 3195.492 mm from the object plane OP to the refractive surface 1 of lens element A, the distance between the rear refractive surface 10 of the lens element G to the front refractive surface 11 of the lens element H is 8.168 mm and the latter distance changes as the focus distance changes because the first focus group 52 which includes lens element H moves axially for focusing. The "Aperture Diameter" at the Image Plane 34 given in Table I is actually the image diameter based on paraxial data. All data in Table I is given at a temperature of 20° C. (68° F.).

TABLE I

| Item | Group | Subgroup | Surface | Separation (mm) | Radius of Curvature (mm) | Type | Code | Name | Aperture Diameter (mm) |
|---|---|---|---|---|---|---|---|---|---|
| Object Plane | | | OP | Infinite 3195.482 1437.921 | Flat | Air | | | |
| A | | | 1 | 29.350 | 295.058 | Glass | 723380 | BAH28 | 252.00 |
| | | | 2 | 194.046 | 2147.773 | Air | | | 250.18 |
| B | 50 | 51 | 3 | 6.650 | −336.508 | Glass | 667331 | PBM39 | 144.90 |
| C | 50 | 51 | 4 | 1.939 | 142.976 | Liquid | 642134 | None | 144.17 |
| D | 50 | 51 | 5 | 10.660 | 154.354 | Glass | 516642 | BSL7 | 144.17 |
| E | 50 | 51 | 6 | 0.300 | 187.120 | Liquid | 295990 | None | 144.83 |
| F | 50 | 51 | 7 | 36.110 | 158.264 | Glass | 438950 | FPL53 | 145.71 |
| | 50 | 51 | 8 | 1.000 | −217.194 | Air | | | 146.39 |
| G | 50 | | 9 | 7.100 | 197.008 | Glass | 773496 | LAH66 | 142.52 |
| | 50 | | 10 | 7.319 8.168 4.884 | 120.250 | Air | | | 136.43 |
| H | 52 | | 11 | 26.650 | 131.697 | Glass | 571508 | BAL2 | 137.30 |
| | 52 | | 12 | 8.342 | −997.410 | Air | | | 136.07 |
| I | 52 | | 13 | 6.700 | −253.396 | Glass | 667331 | PBM39 | 135.37 |
| | 52 | | 14 | 1.000 | −7530.388 | Air | | | 134.64 |
| J | 52 | | 15 | 21.990 | 153.695 | Glass | 583594 | BAL42 | 133.14 |
| | 52 | | 16 | 3.606 35.321 73.727 | −1143.000 | Air | | | 131.160 |
| K | 53 | 55 | 17 | 12.770 | −1774.180 | Glass | 762401 | LAM55 | 96.45 |
| L | 53 | 55 | 18 | 5.100 | −114.090 | Glass | 805254 | TIH6 | 95.07 |
| | 53 | 55 | 19 | 1.000 | 217.156 | Air | | | 86.92 |
| M | 53 | | 20 | 4.900 | 180.721 | Glass | 569563 | BAL14 | 86.17 |
| | 53 | | 21 | 70.712 38.148 3.026 | 120.764 | Air | | | 83.06 |
| N | 54 | | 22 | 10.040 | 116.519 | Glass | 720437 | LAM52 | 64.04 |
| | 54 | | 23 | 0.800 | −194.521 | Air | | | 62.84 |
| P | 54 | | Iris | 1.328 | Flat | Air | | | 59.25 |
| R | 54 | 56 | 24 | 10.960 | 153.440 | Glass | 626357 | PBM1 | 55.16 |
| S | 54 | 56 | 25 | 4.480 | −73.718 | Glass | 773496 | LAH66 | 52.33 |
| | 54 | 56 | 26 | 67.521 | 38.575 | Air | | | 42.70 |
| T | 54 | | Field Stop | 8.644 | Flat | Air | | | 36.00 |
| V | 54 | 57 | 27 | 10.310 | 407.198 | Glass | 720347 | BPH8 | 37.52 |
| W | 54 | 57 | 28 | 2.600 | −30.434 | Glass | 785257 | TIH11 | 37.71 |
| | 54 | 57 | 29 | 10.600 | −55.689 | Air | | | 38.36 |
| X | 54 | | 30 | 2.800 | −67.564 | Glass | 804466 | LAH65 | 33.61 |
| | 54 | | 31 | 5.732 | 57.597 | Air | | | 33.74 |
| Y | 54 | | 32 | 6.940 | 67.910 | Glass | 717295 | PBH1 | 37.06 |
| | 54 | | 33 | 68.000 | −114.579 | Air | | | 37.26 |
| Image Plane | | | 34 | 0.000 | Flat | Air | | | 28.90 |

The "Radius of Curvature" values set forth in Table I have a positive value when the center of the radius of curvature of that refractive surface is closer to the image space 42 than is the vertex of that refractive surface and a negative value when the center of the radius curvature of that refractive surface is closer to the object space 41 than is the vertex of that refractive surface.

In Table I, the Code and Name of the Material for all of the solid lens elements are based on glass lenses manufactured and marketed by Ohara Corporation but many of the glasses are available from other sources and may be substituted if such glasses are substantially similar in optical and mechanical properties, especially refractive index, dispersion, thermal expansion and change of refractive index with temperature. The liquid lens elements C and E in Table I are manufactured by Cargille Laboratories, Inc. and marketed by Lockheed Martin, but any equivalent ADLs may be used. The refractive indices of the ADLs, as supplied by Lockheed Martin from actual test data, for the liquid lens elements C and E for five representative wavelengths and at three different temperatures are set forth in the following Table II.

elements C and E are of no consequence and were not considered because the ADLs are constrained by the surrounding glass elements and conventional mounting elements that include bellows or reservoirs (external to the optical area of use) that accommodate the volumetric change in the ADLs. With these parameters, the approximate polychromatic MTF performance (all at the best focus averaged over the field) in terms of percent (%) Modulation at Radial (R) and Tangential (T) azimuths for wavelengths of 656.3, 587.6, 546.1, 486.1 and 435.8 nanometers with respective weightings of 70, 80, 90, 75, 60 and full field % distortion and % relative illumination, with a normalized field position for maximum image heights equal to 14.45 mm are shown in Table III.

TABLE II

| Liquid Lens | Temperature | | Refractive Indices at wavelengths (nanometers) | | | | |
|---|---|---|---|---|---|---|---|
| Element | °C. | °F. | 656.3 | 587.6 | 546.1 | 486.1 | 435.8 |
| C | 20 | 68 | 1.630387 | 1.642690 | 1.653508 | 1.678028 | 1.716612 |
| C | 40 | 104 | 1.619870 | 1.631899 | 1.642414 | 1.666424 | 1.704113 |
| C | 0 | 32 | 1.640904 | 1.653481 | 1.664602 | 1.689632 | 1.729111 |
| E | 20 | 68 | 1.296909 | 1.297816 | 1.298522 | 1.299864 | 1.301440 |
| E | 40 | 104 | 1.289842 | 1.290744 | 1.291448 | 1.292759 | 1.294264 |
| E | 0 | 32 | 1.303976 | 1.304888 | 1.305596 | 1.306969 | 1.308616 |

The image quality of the optical system 60 has been computed theoretically in accordance with accepted optical

TABLE III

| Object to Image Distance | Temperature | | 0 | ½ | | ¾ | | Full | | | % Relative |
|---|---|---|---|---|---|---|---|---|---|---|---|
| (mm) | °C. | °F. | R & T | R | T | R | T | R | T | % Distortion | Illumination |
| Infinity | 20 | 68 | 82.1 | 82.5 | 81.8 | 84.4 | 77.0 | 84.6 | 67.9 | 0.4 | 51 |
| 3863.94 | 20 | 68 | 84.2 | 84.7 | 83.2 | 84.2 | 79.1 | 83.1 | 71.6 | 0.4 | 56 |
| 2105.92 | 20 | 68 | 75.1 | 74.1 | 75.0 | 75.6 | 75.6 | 77.6 | 71.9 | 0.4 | 57 |
| 3863.94 | 40 | 104 | 60.6 | 62.2 | 62.4 | 64.2 | 60.0 | 67.1 | 54.2 | 0.4 | 55 |
| 3863.94 | 0 | 32 | 72.4 | 70.1 | 70.7 | 68.0 | 68.0 | 65.2 | 62.8 | 0.4 | 56 | principles and programs to provide image quality data in terms of modulation, i.e. contrast, of the modulation transfer function (commonly known by the acronym MTF), the results of which are shown in the following Table III. The image quality data in terms of MTF was calculated on the basis of a temperature of 20° C. for three focal distances and at temperatures of 0° C. and 40° C. at the nominal design focus distance, as shown in Table III, and the data assumed an all aluminum support structure 43. The glass coefficients of refractive index and expansion with temperature were obtained from commonly available data publications produced by the vendor, Ohara Corporation. The refractive index of the two liquid lens elements C and E were obtained from the vendor, Lockheed Martin. The liquid thermal expansion coefficients of the ADLs of the two liquid lens Table III illustrates that the optical system 60 is optimized for maximum performance at object to image distances from about three meters to infinity at a temperature of 20° C. (68° F.). The system full aperture is f/2.75 at all focus distances and temperatures. The spectral waveband of the optical system is 435.8 to 656.3 nanometers. At 20° C. (68° F.) and for an object at infinity distance, the effective focal length (EFL) of this optical system is approximately 692.9 mm. The telephoto ratio of the EFL to the overall length of approximately 668 mm (measured from the vertex of surface 1 of lens element A to the image surface 34) is 668/692.9 equals 0.964. Generally, for a lens to be considered telephoto, the telephoto ratio should be less than 1.0. Although the telephoto ratio of 0.964 of the optical system 60 is not much less than 1.0, this is the result of optionally selected design features of the internal housing optics that consume considerable length along the optical axis 40, such as the first and second independently movable focus groups 52 and 53. The telephoto ratio can easily be reduced to less than 0.9 by excluding one or more of the optional design features described above. The focus range of the optical system 60, as measured axially from the object to the image plane 34 at 20° C. is from infinity to 2.106 meters (6'10.9") and has a close focus magnification of 2.53:1 (object:image). The temperature range of the optical system 60, as designed and described above, is 0° C. (32° F.) to 40° C. (104° F.) with a nominal design temperature of 20° C. (68° F.). However, this optical system will maintain a high level of performance over at least an extended temperature range of −10° C. to +50° C., although some degradation of image quality may be observed at high temperatures. It should be noted that within the temperature range of −10° C. to +50° C., the ADLs of the liquid lens elements C and E will not solidify and, of course, the solid lens elements will not liquify. The optical system 60 provides the required "high performance" as measured by the polychromatic MTF being greater than 70% and preferably greater than 80% (on axis) and 60% to 70% (off axis) over the field, as shown by the values set forth in Table III.

It should be noted that while the liquid materials or ADLs of the liquid lens elements C and E have been described as partly or highly "abnormal" and the material of the solid lens element F has been described as a glass or crystalline that is relatively moderately temperature sensitive and relatively partly "abnormal" that these descriptions relate to the differences in characteristics of those materials from normal, classical or standard optical materials, usually glass. Here, the material of solid lens element F is described as having a dispersion which is relatively partly abnormal only by comparison to the liquid material of liquid lens element C which is highly abnormal compared to other glasses but indeed the solid lens element F is substantially abnormal when compared to normal glasses. It will readily appear to those skilled in the art from the teachings of this invention that numerous variations in the materials for the liquid lens elements and the solid lens elements, whether available now or in the future, may be adopted without departing from the teachings of this invention so long as the resultant optical system 60 is athermal and corrected for chromatic aberrations and other aberrations.

What is claimed is:

1. A visible waveband optical system comprising, an objective lens for delivering visible radiation emanating from an object space to a radiation detecting device, said objective lens including a plurality of lens elements in a plurality of lens groupings mounted in spaced apart relationship on a common support assembly and aligned on a common optical axis, a first lens grouping adjacent the object space formed by a telephoto objective lens comprising primary and secondary lens groups, said first lens grouping arranged to accept visible radiation from the object space and remaining lens groupings are sequentially arranged to accept and relay said radiation from the first lens grouping to form a real image thereof at an external image surface, said primary lens group formed by a single lens element, said secondary lens group formed by a quintuplet lens and a singlet lens element, said primary lens group being positively powered and made of a glass material having a refractive index and expansion which are substantially temperature insensitive and a dispersion which is substantially normal, the secondary lens group being negatively powered with said quintuplet lens being formed by a sandwich of three solid lens elements and two liquid lens elements in a solid/liquid/solid/liquid/solid configuration, said liquid lens elements being separate from each other, two of said solid lens elements made of glass materials having a refractive index and expansion which are substantially temperature insensitive and a dispersion which is substantially normal, a third solid lens element of said three solid lens elements made of at least one of either a glass or crystalline material having a refractive index and expansion which are temperature sensitive and a dispersion which is abnormal, said two liquid lens elements being visibly transmissive optical liquids having refractive indices which are temperature sensitive and the dispersions which are abnormal, and said singlet lens element of said secondary lens group is made of glass material having a refractive index and expansion which are substantially temperature insensitive and a dispersion which is substantially normal, said optical system being such that chromatic and thermal aberrations introduced by lens element refractive index, dispersion and expansion and displacements caused by the expansion of said support assembly are compensated by said two liquid lens elements and said third solid lens element of glass or crystalline material so that the optical system is rendered substantially passively athermal both in constancy of image position and image quality.

2. The optical system of claim 1 further comprising an internal focusing lens group.

3. The optical system of claim 1, further comprising two internal focusing lens groups.

4. The optical system of claim 2 or 3, wherein said focusing lens groups are internally movable relative to the support assembly, said support assembly having a fixed length.

5. The optical system of claim 4, further comprising an auxiliary lens group for forming an image.

6. The optical system of claim 5 wherein said lens groups are arranged on the common axis in the order of said primary lens group, said quintuplet lens, said singlet lens element, said two focusing lens groups, and said auxiliary lens group.

7. The optical system of claim 1, wherein said singlet lens element is made of one of either a glass or a crystalline material having a refractive index and expansion which are temperature sensitive and a dispersion which is abnormal, and said quintuplet lens has three solid elements made of glasses, the refractive index and expansion of which are substantially temperature insensitive and the dispersions of which are substantially normal.

8. The optical system as claimed in claim 1, wherein said common support assembly is made of aluminum.

9. A visible waveband optical system, comprising, an objective lens group having a single lens element and a quintuplet lens aligned on a common axis and substantially spaced from each other with said quintuplet lens being closer to an image plane, said quintuplet lens comprised of first, second and third solid lens elements and first and second liquid lens elements with said first liquid lens element formed between said first and second solid lens elements and said second liquid lens element formed between said second and third solid lens elements, said first and second liquid lens elements being of two different visibly transmissive optical liquids having temperature sensitive refractive indices and abnormal dispersions for producing chromatic and thermal aberration corrections, two of said solid lens elements being of glass materials having refractive indexes and coefficients of thermal expansion which are substantially temperature insensitive, and the remaining one of the three solid lens elements having a refractive index and a coefficient of thermal expansion which are temperature sensitive for producing chromatic and thermal aberration corrections that are uncorrected by said two liquid lens elements.

10. The optical system of claim 9, wherein said single lens element is positively powered for receiving radiation from an object and transmitting the radiation to said quintuplet lens.

11. The optical system of claim 9 or 10, wherein said quintuplet lens is negatively powered.

12. The optical system of claim 11, further comprising a focusing lens group.

13. The optical system of claim 11, further comprising two focusing lens groups, wherein each focusing lens group is independently movable along the common axis.

14. The optical system of claim 13, further comprising an auxiliary lens group for forming an image on said image plane.

15. The optical system of claim 14, wherein said lens groups are arranged on the common axis in the order of said single positively powered lens element, said quintuplet lens, said two focusing lens groups, and said auxiliary lens group.

16. The optical system of claim 9, wherein said optical liquid of said first liquid lens element has a refractive index and abnormal dispersion for producing primarily chromatic correction, and said optical liquid of said second liquid lens element has characteristics for producing primarily thermal aberration correction.

17. The optical system of claim 16, wherein said optical liquid of said second liquid lens primarily corrects thermal aberrations created by said first liquid lens.

18. The optical system of claim 16, wherein said first liquid lens is located on a side of said second solid lens that is closer to said single lens element.

19. The optical system of claim 9 or 18, wherein said remaining one of the three solid lens elements is located on a side of said quintuplet lens farther than said two solid lens elements from said single lens element.

20. A visible waveband optical system, comprising, an objective lens group having a single lens element and a quintuplet lens aligned on a common axis and substantially spaced from each other with said quintuplet lens being closer to an image plane, said quintuplet lens comprised of first, second and third solid lens elements and first and second liquid lens elements with said first liquid lens elements formed between said first and second solid lens elements and said second liquid lens element formed between said second and third solid lens elements, said first and second liquid lens elements being of two different visibly transmissive optical liquids having temperature sensitive refractive indices and abnormal dispersions for producing chromatic and thermal aberration corrections, said objective lens group also having a second single lens and a focusing lens group, at least one lens element of said single lens element, second single lens element, first, second and third solid lens elements and said focusing lens group being of a solid material having a refractive index and a coefficent of thermal expansion for producing chromatic and thermal aberration corrections that are uncorrected by said two liquid lens elements.

21. The optical system of claim 20, wherein said single lens element is positively powered for receiving radiation from an object and transmitting the radiation to said quintuplet lens, and said quintuplet lens is negatively powered.

22. The optical system of claim 21, wherein said second single lens is said one lens element.

23. The optical system of claim 22 wherein said lens groups and elements are arranged on the common axis in the order of said single lens element, said quintuplet lens, said second single lens and said focusing lens group.

24. The optical system of claim 20, wherein said optical liquid of said first liquid lens element has a refractive index and abnormal dispersion for producing primarily chromatic correction, and said optical liquid of said second liquid lens element has characteristics for producing primarily thermal aberration correction.

25. The optical system of claim 24, wherein said optical liquid of said second liquid lens primarily corrects thermal aberrations created by said first liquid lens.

26. The optical system of claim 24, wherein said first liquid lens is located on a side of said second solid lens that is closer to said single lens element.

27. A visible waveband optical system comprising:

lens elements, groups and subgroups supported and arranged on a common axis from an end closer to an object to an end closer to an image formed by the optical system, in the following order;

a first single lens A, a quintuplet lens having lens elements B, C, D, E and F, a second single lens G, a first focusing lens group having lens elements H, I and J, a second focusing lens group having lens elements K, L and M, and an auxiliary lens group having a lens element N, an iris P, lens elements R and S, a field stop T, and lens elements V, W, X and Y;

wherein said lens elements C and E are of optical liquid materials and the remaining lens elements are of solid materials, and wherein the lens elements, groups and subgroups have characteristics with respect to an object plane and an image plane at three representative focus distances, as follows;

| Item | Group | Subgroup | Surface | Separation (mm) | Radius of Curvature (mm) | Material Type | Material Code | Material Name | Aperture Diameter (mm) |
|---|---|---|---|---|---|---|---|---|---|
| Object Plane | | | OP | Infinite 3195.492 1437.921 | Flat | Air | | | |
| A | | | 1 | 29.350 | 295.058 | Glass | 723380 | BAH28 | 252.00 |
| | | | 2 | 194.046 | 2147.773 | Air | | | 250.18 |
| B | 50 | 51 | 3 | 6.650 | −336.508 | Glass | 667331 | PBM39 | 144.90 |
| C | 50 | 51 | 4 | 1.939 | 142.976 | Liquid | 642134 | None | 144.17 |
| D | 50 | 51 | 5 | 10.660 | 154.354 | Glass | 516642 | BSL7 | 144.17 |
| E | 50 | 51 | 6 | 0.300 | 187.120 | Liquid | 295990 | None | 144.83 |

-continued

| Item | Group | Subgroup | Surface | Separation (mm) | Radius of Curvature (mm) | Type | Material Code | Name | Aperture Diameter (mm) |
|---|---|---|---|---|---|---|---|---|---|
| F | 50 | 51 | 7 | 36.110 | 158.264 | Glass | 438950 | FPL53 | 145.71 |
|   | 50 | 51 | 8 | 1.000 | −217.194 | Air |   |   | 146.39 |
| G | 50 |   | 9 | 7.100 | 197.008 | Glass | 773496 | LAH66 | 142.52 |
|   | 50 |   | 10 | 7.319 | 120.250 | Air |   |   | 136.43 |
|   |   |   |   | 8.168 |   |   |   |   |   |
|   |   |   |   | 4.884 |   |   |   |   |   |
| H | 52 |   | 11 | 26.650 | 131.697 | Glass | 571508 | BAL2 | 137.30 |
|   | 52 |   | 12 | 8.342 | −997.410 | Air |   |   | 136.07 |
| I | 52 |   | 13 | 6.700 | −253.396 | Glass | 667331 | PBM39 | 135.37 |
|   | 52 |   | 14 | 1.000 | −7530.388 | Air |   |   | 134.64 |
| J | 52 |   | 15 | 21.990 | 153.695 | Glass | 583594 | BAL42 | 133.14 |
|   | 52 |   | 16 | 3.606 | −1143.000 | Air |   |   | 131.160 |
|   |   |   |   | 35.321 |   |   |   |   |   |
|   |   |   |   | 73.727 |   |   |   |   |   |
| K | 53 | 55 | 17 | 12.770 | −1774.180 | Glass | 762401 | LAM55 | 96.45 |
| L | 53 | 55 | 18 | 5.100 | −114.090 | Glass | 805254 | TIH6 | 95.07 |
|   | 53 | 55 | 19 | 1.000 | 217.156 | Air |   |   | 86.92 |
| M | 53 |   | 20 | 4.900 | 180.721 | Glass | 569563 | BAL14 | 86.17 |
|   | 53 |   | 21 | 70.712 | 120.764 | Air |   |   | 83.06 |
|   |   |   |   | 38.148 |   |   |   |   |   |
|   |   |   |   | 3.026 |   |   |   |   |   |
| N | 54 |   | 22 | 10.040 | 116.519 | Glass | 720437 | LAM52 | 64.04 |
|   | 54 |   | 23 | 0.800 | −194.521 | Air |   |   | 62.84 |
| P | 54 |   | Iris | 1.328 | Flat | Air |   |   | 59.25 |
| R | 54 | 56 | 24 | 10.960 | 153.440 | Glass | 626357 | PBM1 | 55.16 |
| S | 54 | 56 | 25 | 4.480 | −73.718 | Glass | 773496 | LAH66 | 52.33 |
|   | 54 | 56 | 26 | 67.521 | 38.575 | Air |   |   | 42.70 |
| T | 54 |   | Field Stop | 8.644 | Flat | Air |   |   | 36.00 |
| V | 54 | 57 | 27 | 10.310 | 407.198 | Glass | 720347 | BPH8 | 37.52 |
| W | 54 | 57 | 28 | 2.600 | −30.434 | Glass | 785257 | TIH11 | 37.71 |
|   | 54 | 57 | 29 | 10.600 | −55.689 | Air |   |   | 38.36 |
| X | 54 |   | 30 | 2.800 | −67.564 | Glass | 804466 | LAH65 | 33.61 |
|   | 54 |   | 31 | 5.732 | 57.597 | Air |   |   | 33.74 |
| Y | 54 |   | 32 | 6.940 | 67.910 | Glass | 717295 | PBH1 | 37.06 |
|   | 54 |   | 33 | 68.000 | −114.579 | Air |   |   | 37.26 |
| Image Plane |   |   | 34 | 0.000 | Flat | Air |   |   | 28.90 |

\* \* \* \* \*